UNITED STATES PATENT OFFICE.

FRANZ SCHLATTNER, OF BIESENTHAL, GERMANY, ASSIGNOR OF ONE-HALF TO WILHELM STREITZIG, OF REICHENBERG, AUSTRIA-HUNGARY.

MANUFACTURE OF ARTIFICIAL MARBLE.

1,120,632. Specification of Letters Patent. Patented Dec. 8, 1914.

No Drawing. Application filed March 27, 1914. Serial No. 827,604.

*To all whom it may concern:*

Be it known that I, FRANZ SCHLATTNER, a subject of the Emperor of Germany, residing at Biesenthal, Germany, have invented certain new and useful Improvements in the Manufacture of Artificial Marble, of which the following is a specification.

My invention relates to a process of manufacturing artificial marble.

There already exist various processes for the manufacture of artificial marble, in which the pieces of marble are manufactured of such a size as to be ready for use, (*e. g.* in the form of building blocks, tiles, tablets, etc.), or in which larger pieces are first made, which are to be cut to the required size. For the preparation of the plastic mass to be molded, there has been employed cement, (tricalcium silicate) and stone dust, according to the intended use of the marble, with the addition of any suitable coloring matter and also modifying ingredients added to the water. Special machines are employed for mixing the mass, the construction of which machines varies according as to whether the color is added to the mass, while said color is in powdered or liquid condition. With all of these processes it has hitherto been impossible to produce an artificial marble which showed broken vein conglomerate intermixtures, such as those shown by some of the natural marbles, but I am able to attain this purpose by the process described below, it being of special importance that the mass, which is contained in a mold and consists of liquid and solid ingredients, is well shaken, it of course being an essential feature that the liquid mass possesses the same or nearly the same specific gravity as the solid ingredients.

The mass, which consists of cement, stone-dust, coloring matter and water containing water soluble fluorids, and of even or varying appearance, is first divided into small pieces, mixed, screened over with liquid vein-forming material, again mixed, poured over with a thin-flowing mass which absorbs the color, and then put into a mold.

In order to produce a close and intimate combination of the individual particles with through-going veins of natural appearance, the mold is shaken in a peculiar manner and the masses then subjected to pressure. In order to obtain further cross-veins and dislocations, in imitation of natural marble, the structure of the masses is torn by the powerful shocks and blows, and thus the peculiar structure of the natural stone is obtained, and, by the addition thereafter of specially prepared unbroken masses, round, or of other characteristic shape, conglomerates, mixtures and speckles of natural appearance are obtained. During the breaking operation, the mass is dampened for several days with water containing fluorid. The bodies so obtained can be ground, the surfaces filed, then again ground and afterward laid in water with which a fluorid is mixed, whereupon the body may again be ground and polished. Large blocks may first be prepared and then cut into slabs and further treated as required.

From the above it can be seen that the new process can be carried out in the most varied manners. One example might be the mixture of $\frac{1}{4}$ cement, (tricalcium silicate) and $\frac{3}{4}$ stone-dust to which during the mixing, water with the addition of a fluorid is added, until the whole forms a pulp. After this, the coloring matter is added which gives the marble the desired color. A portion of this mixture is then taken away and a further amount of a second coloring matter is added to the remainder, this being repeated as many times as the number of different shades of color which are desired. The individually colored portions are then mixed with fresh dry material and with any desired coloring matter until the whole forms a solid mass. This solid mass is then cut into small pieces which are well mixed, whereupon the vein forming material is sifted over the mass, the desired veining being taken into consideration. The mass is then roughly mixed, and is spread out to produce a layer. A thin-flowing pulp, having that color intended for the second veins or speckles, is then shaken over said layer, and the whole is made into one heap from which the individual molds are filled. The mechanical shaking of the mold as above described is then given, the liquid color shades running in and among each other, and thin flowing veins and characteristic color shades and speckles, such as occur in natural stones, are produced.

According to this process every kind of marble with through-going veins of natural appearance can be produced.

After loosening, the surfaces of the slabs may be ground, and the surface filed and smoothed off and, when the filling substance is solid, the plates are again ground and after this grinding laid for three days in a bath of water with the addition of a fluorid. By means of this bath, the slabs are again hardened and the slabs thus hardened are again ground and polished as in the case with natural marble.

I have referred in this specification to stone dust, and I call attention to the fact that this material must be in the form of dust, but that is to say a fine powder, and not in the form of ordinary crushed stone, composed of granules or pieces of considerable size. Ordinary sand can not be substituted for the stone dust, and the particles of the stone dust must be very much smaller than the grains of ordinary sand.

What I claim is:—

1. A process of making artificial marble which comprises mixing cement, stone dust, water and a fluorid in proportions to form a pulp, adding different coloring materials, to different portions thereof, mixing the several portions and fresh dry material in proportions to form a solid mass, subdividing the solid mass, and adding thereto a suitable vein-forming material, roughly mixing to leave the principal veins in the mass, adding a second fluent vein-forming material, placing the mixture into molds, shaking the molds, and thereafter allowing the mass to solidify.

2. A process of making artificial marble which comprises producing a mixture containing cement, stone dust, and a fluorid, and subdividing the same, adding to this a suitably colored vein-forming material in the form of a fluent mass, and roughly mixing the mass, placing the mass into molds, and violently agitating the molds to allow the vein-forming material to spread out.

3. A process of making artificial marble which comprises producing a solidified mixture containing about one part of cement to two parts of stone-dust, together with a fluorid, and subdividing the same, adding to this a suitably colored vein-forming material in the form of a fluent mass, and roughly mixing the mass, placing the mass into molds, and violently agitating the molds to allow the vein-forming material to spread out.

In testimony whereof I affix my signature in presence of two witnesses.

FRANZ SCHLATTNER.

Witnesses:
  F. HREITZIG,
  THE. AGTA.